INVENTOR
C. C. CUTLER
BY
ATTORNEY

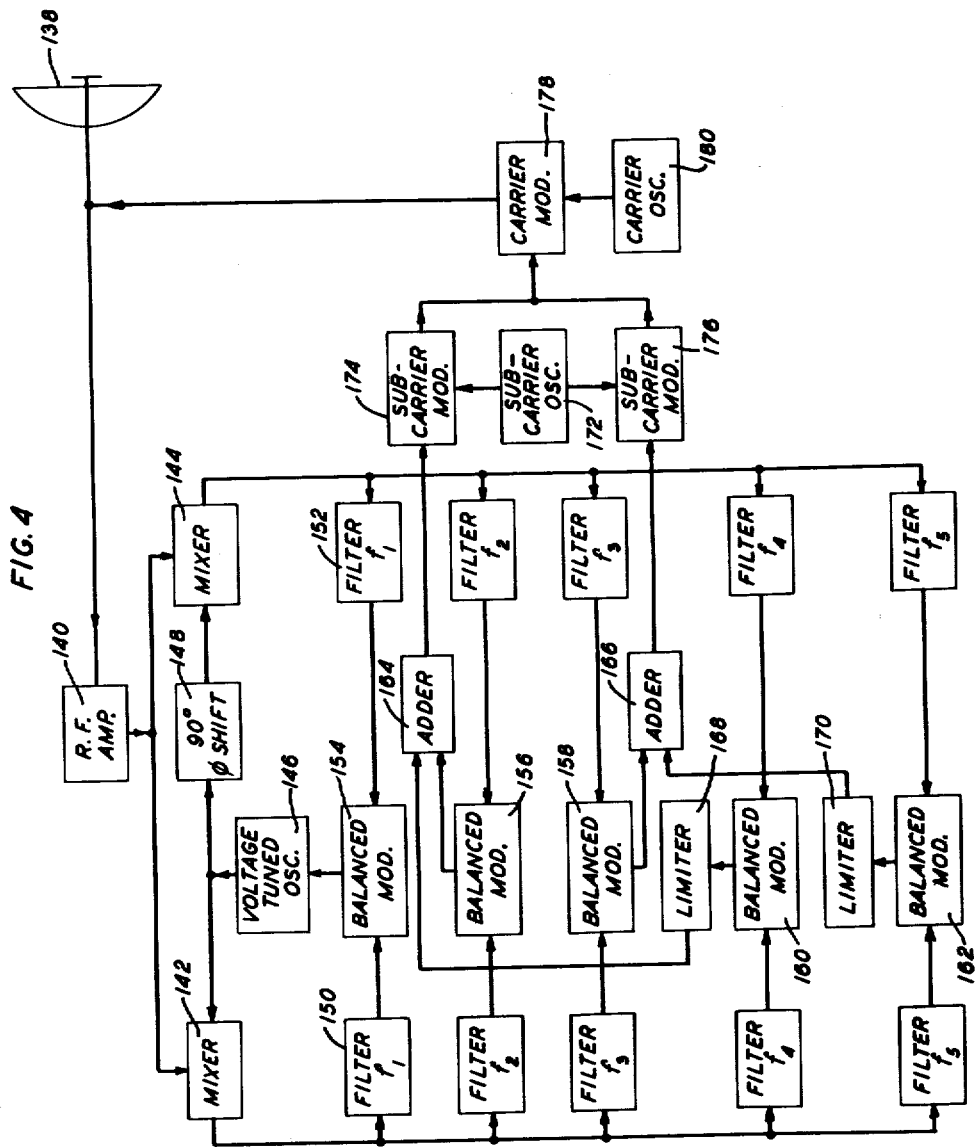

United States Patent Office 3,060,425
Patented Oct. 23, 1962

3,060,425
REMOTE ATTITUDE CONTROL OF EARTH SATELLITES
Cassius C. Cutler, Gillette, N.J., assignor to Bell Telephone Laboratories, Incorporated, New York, N.Y., a corporation of New York
Filed Oct. 1, 1959, Ser. No. 843,737
13 Claims. (Cl. 343—112)

This invention relates to earth satellites and more particularly to systems for remotely controlling the attitude of an earth satellite from a base station and to satellite arrangements for use in such systems.

Earth satellites have been proposed for many military and non-military applications. Outstanding among the proposed uses for such satellites are those involving communication and particularly those wherein one or more earth satellites serve as repeater stations for long-distance broadband communication systems. In such applications, the earth satellite may serve as either an active or a passive repeater of microwave signals directed to the satellite from one station for retransmission to a second station. Although in special instances the entire satellite may serve as an isotropic reflector as, for example, where the satellite comprises no more than a metallic spherical balloon, most efficient communication systems require the use of oriented antennas or reflectors which may be directed for efficient reception or re-radiation of radio energy in predetermined directions. The use of such antennas or reflectors, of course, contemplates control in some manner of the spatial orientation of the satellite so that the antennas may be appropriately directed.

Aside from a class of orientation systems wherein the satellite is launched with an initial spin, and thenceforth remains oriented with the axis of maximum moment of inertia normal to the plane of this orbit, attitude control systems involve means at a base or control station for determining thhe present attitude of the satellite and comparing this with a desired attitude together with means in the satellite responsive to control signals generated at the base station for correcting the existing attitude of the satellite in accordance with the results of the comparison referred to above.

Because of the large distances involved and the relatively very small dimensions of the satellite, measurement of the attitude of the satellite from a remote station by the usual methods is at best, difficult and, at worst, so inaccurate that no practicable control of satellite attitude is possible. It is accordingly the object of the present invention to control from a remote station the attitude of at least one axis of an earth satellite to a higher degree of accuracy than has hitherto been possible.

In accordance with the above object, attitude control of a space satellite from a remote terminal or ground station is accomplished by a system of interferometry by means of which the relative orientation of a radio transmitter on the satellite rather than that of receiving stations on the ground is measured at the remote point. Accordingly, a plurality of radiators is disposed upon the satellite in a plane transverse to the axis of the satellite which is to be controlled to remain in alignment with the line-of-sight to the remote station. Individual ones of these antennas are supplied with different suppressed-carrier, double-sideband signals, all derived from the same carrier. At the control or terminal station, one pair of sidebands is used to reconstitute the common carrier. The remaining pairs of sidebands are demodulated using the reconstituted carrier to yield outputs, the phases and amplitudes of which indicate the orientation of the satellite with respect to the chosen axis. These outputs are suitable for use as control signals to be sent to attitude determinative means on the satellite.

In accordance with another aspect of the invention, accuracy is improved by an additional array of satellite antennas also located in the plane of the satellite normal to the axis to be controlled. In the modified arrangement, the antennas of one array are spaced by distances large with respect to one-half wavelength of the carrier frequency to achieve high accuracy in measurement, while the antennas of another portion of the array are spaced by amounts less than one-half wavelength of the carrier frequency to provide signals which, while of low accuracy, are unambiguous. At the ground station, signals derived from the two arrays may be combined to yield a composite signal of high accuracy and low ambiguity.

In other aspects, the invention contemplates the provision of satellite systems such that their orientation may be determined with high accuracy by interferometric methods and ground stations equipped to perform such determinations from the signals radiated from two or more spaced points in a reference plane on a satellite.

The above and other features of the invention will be described in the following specification taken in connection with the drawings in which.

Figure 1:
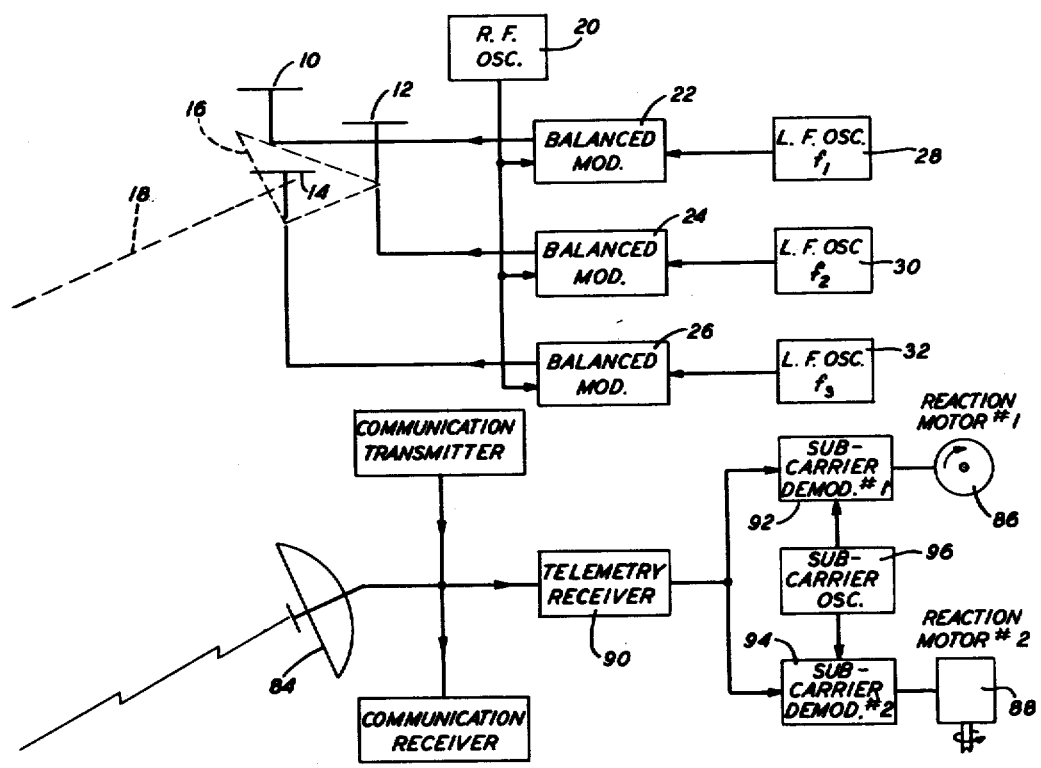
FIG. 1 is a block schematic diagram of a space satellite system according to the invention.
Figure 2:
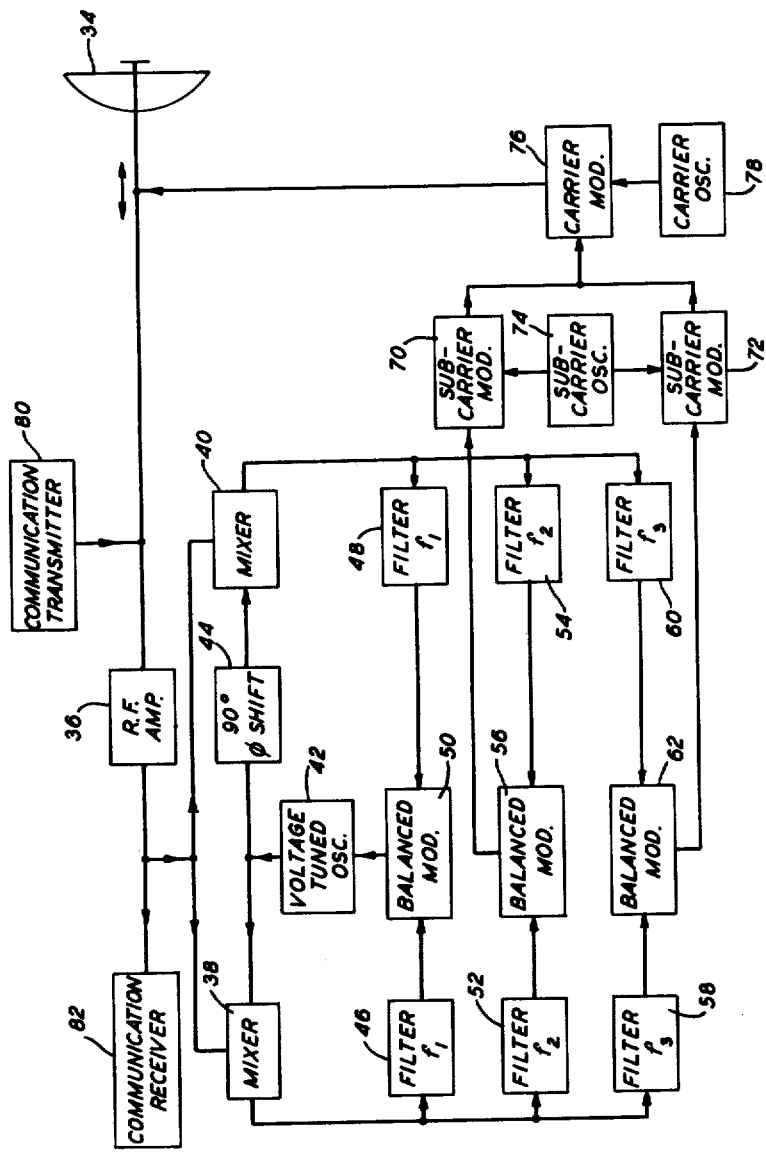
FIG. 2 is a block schematic diagram of a ground station for use in controlling the attitude of the space satellite shown in FIG. 1.
Figure 3:
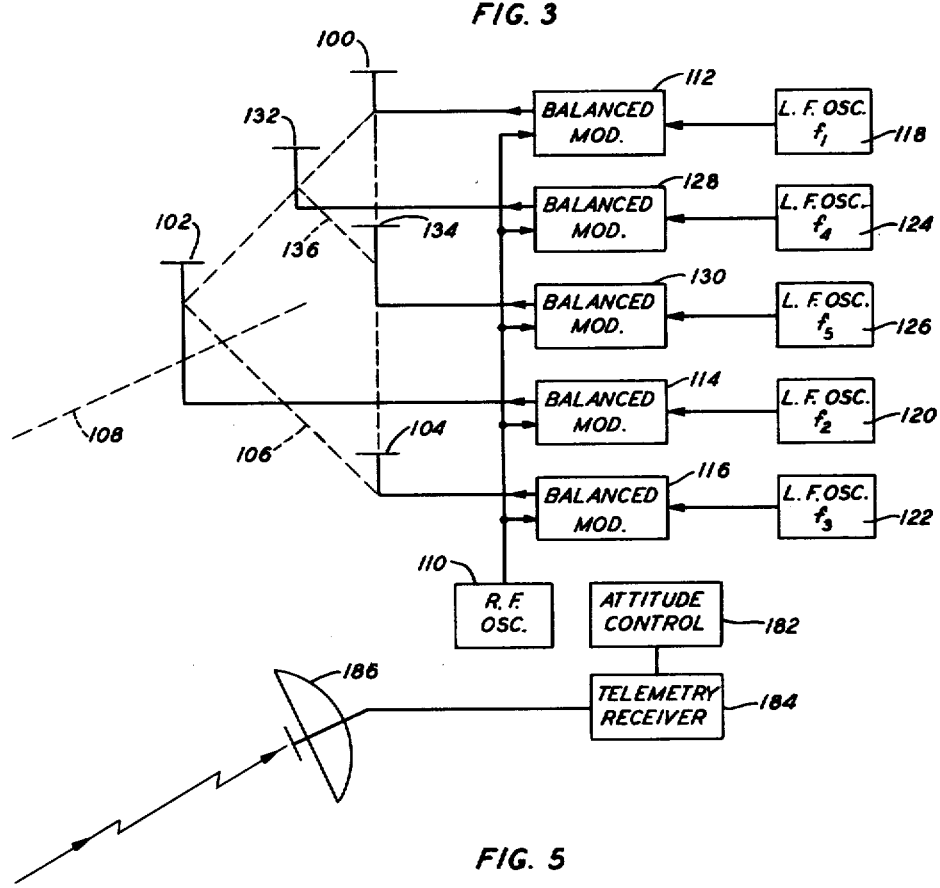
Figure 5:
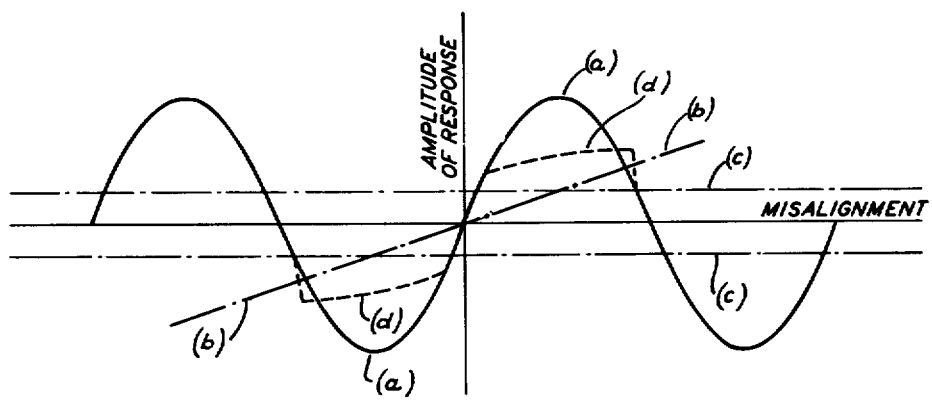

FIGS. 3 and 4 are block schematic diagrams of modifications of the ground station and satellite equipments of FIGS. 1 and 2, respectively, arranged for remote control of satellite orientation with increased accuracy; and FIG. 5 is a graph illustrative of the operation of the system shown in FIGS. 3 and 4.

As has been stated above, remote control of the orientation of an earth satellite is accomplished, according to the invention, by a system which effectively operates upon interferometric principles to measure at a ground station the orientation of a remote transmitter. This is substantially the inverse of the usual radio-direction finding systems known in the art. The specific details of the equipment provided at the ground station for use in the system of the invention are dependent to a large extent upon the equipment provided on the satellite. The overall system, however, must include at least means on the satellite for producing and radiating a plurality of signals which may be compared by equipment located at the control station to yield information as to the orientation of the satellite. In addition, the satellite must be provided with apparatus for controlling its attitude about at least the controlled axis in response to control signals transmitted over some form of telemetry facility. The ground station, on the other hand, must be arranged to receive the plural signals generated on the satellite to derive error signals indicative of misalignment of the satellite reference axis from a chosen orientation, the production of telemetry signals related to these error signals, and the transmission of such telemetry signals to the satellite.

As shown in FIG. 1, equipment may be provided on a satellite to permit orientation of the satellite so that a reference axis thereon is aligned with the line-of-sight to a remote control station. For this purpose, a plurality of simple antennas, here shown as three dipole antennas 10, 12, and 14, may be located at the vertices of a triangle 16, the plane of which is to be maintained normal to the line-of-sight to a control station, such line-of-sight being shown at 18. Each of antennas 10, 12, and 14 is excited by a different double-sideband signal derived from a common carrier signal produced by radio-frequency oscillator 20. For this purpose, the output of oscillator 20 is applied to balanced modulators 22, 24, and 26 associated, respectively, with antennas 10, 12, and 14. In these balanced modulators, the carrier is modulated in conventional fashion by low frequency signals of frequencies $f_1$, $f_2$, and $f_3$ derived, respectively, from low frequency oscillators 28, 30, and 32. In each case, the output of the balanced modulator is a double-sideband, amplitude-modulated signal from which the carrier is conveniently suppressed by conventional techniques in order to increase the efficiency of the transmission system and reduce power requirements on the satellite.

At the ground station, as shown in FIG. 2, the different double-sideband, suppressed-carrier signals generated upon the satellite are received by antenna 34, and, after amplification in radio frequency amplifier 36, are directed to a pair of mixers 38 and 40 in which they are combined with the output of a local oscillator 42. In accordance with the invention, one pair of double sidebands is employed to control the frequency of local oscillator 42 and this oscillator then serves as a source of reconstituted carrier signals for demodulation of the other sideband pairs. Appropriate control of local oscillator 42 may be accomplished in general according to the method described by John P. Costas in an article entitled "Synchronous Communications" appearing in Proceedings of the I.R.E. for December 1956, beginning at page 1713. In the system there described, double-sideband, amplitude-modulated signals are caused to yield the modulating signals directly by so-called synchronous detection wherein the locally generated carrier is caused to hold the same frequency as, and to be coherent with, that employed at the transmitter in producing the sidebands. For this purpose and as shown in FIG. 2, the output of oscillator 42 is applied directly to one input of mixer 38 and through a phase shifter 44 introducing a phase shift of 90 degrees to one input of mixer 40.

The demodulated signals corresponding to the sidebands generated on the satellite by low frequency oscillator 28 are abstracted from the outputs of mixers 38 and 40, respectively, by filters 46 and 48, tuned to the modulating frequency $f_1$ employed at the transmitter. The outputs of filters 46 and 48 are combined in a balanced modulator 50 and effectively compared in phase and amplitude to yield a direct-current output, the polarity and amplitude of which are indicative of the departure of the phase and frequency of local oscillator 42 from the corresponding quantities of the oscillator at the transmitter by which the sidebands passing filters 46 and 48 were produced. This error signal may be characterized as being of a predetermined value when oscillator 42 is appropriately tuned but to be of a value comprising two components, one derived from mixer 38 and one from mixer 40 at all other times. The output of mixer 38 may be looked upon as providing the normal constant value of control voltage while mixer 40, corresponding only to signals in quadrature, will provide no output when the desired frequency exists. At any other time, the output from mixer 40 to which the quadrature signal is applied will be present and will add to or subtract from that derived from mixer 38, depending upon the phase of the error.

The carrier frequency reconstituted by the arrangement described above and represented by the output of local oscillator 42 is employed to demodulate the paired sidebands radiated by antennas 12 and 14 on the satellite. Here, the process of demodulation outline above is essentially repeated and yields error signals which are indicative of the differences between the phase of local oscillator 42 and the corresponding quantities of the carriers which would have been reconstituted had the respective sideband pairs been employed for this purpose.

To this end, the outputs of mixers 38 and 40, respectively, are applied through filters 52 and 54 to a balanced modulator 56 and through filters 58 and 60 to a balanced modulator 62. Filters 52 and 54 are tuned to pass modulating frequency $f_2$ employed at the satellite transmitter for the excitation of antenna 12, while filters 58 and 60 pass the frequency $f_3$ employed in the generation of the signal radiated from antenna 14 on the satellite. Balanced modulators 56 and 62 produce outputs similar to that produced by balanced modulator 50 and differing therefrom only in that they represent, respectively, the phase differences between the carrier generated by local oscillator 42 and those carriers which would have been reconstituted had these sideband pairs been employed for control of the local oscillator. The differences so measured represent differences in phase of the signals arriving at antenna 34 of the control station from antennas 10 and 12 and 10 and 14, respectively, and therefore carry information concerning the relative distances of these antennas from the common receiving antenna.

These signals, which are essentially direct-current signals, the amplitude and polarity of which are representative of the phase and amplitude of the errors, are suitable for use in remote control of the satellite orientation and may be employed to generate signals for telemetry transmission to the satellite in well-known manner. For example and as shown in FIG. 2, the error signals derived from balanced modulators 56 and 62, respectively, are applied to subcarrier modulators 70 and 72 to each of which is also supplied the output of a subcarrier oscillator 74. The modulated subcarrier signals derived from modulators 70 and 72 are applied as a modulating wave for a carrier modulator 76 to which is applied the output of a carrier oscillator 78 and the output of modulator 76 may be applied directly to antenna 34 for radiation to the satellite. In addition and as shown in FIG. 1, a communication channel for the transmission of appropriate information between the satellite and the control station may be provided and may include a communication transmitter 80 and a communication receiver 82, all coupled to antenna 34 at the ground station. Although not shown, it will be obvious that appropriate hybrid networks or isolation networks will be required to separate the various signals received by and transmitted from antenna 34. These may include filters, isolators, hybrid junctions, or the like.

At the satellite, the telemetry signals produced at the control station, as described heretofore or otherwise, are received by an antenna 84 and employed to control the attitude of the satellite. While the actual mechanism by which the attitude of the satellite may be controlled may take any of a number of forms, that shown in FIG. 1 is based upon the principle of conservation of momentum and utilizes a pair of reaction motors 86 and 88, the rotational axes of which are normal to one another and lie in the plane 16 or in a plane parallel thereto which, in turn, is normal to the line-of-sight axis of the satellite. Each of motors 86 and 88 is arranged to drive a small flywheel or, alternatively, the armatures of these motors are weighted and in accordance with the laws of conservation of momentum, rotation of the mass of the motor armature and/or flywheel in one direction about the motor axis must result in the opposite rotation of the satellite as a whole about the same axis. Obviously, many revolutions of the small mass driven by the motor may be required to produce even a small rotation of the satellite in the opposite direction.

It will be recognized that this attitude control system requires two control signals which correspond to those generated at the ground station to orient plane 16 to be normal to the line-of-sight to the ground station. These control signals are derived from the signal received from the ground by antenna 84 in a telemetry receiver 90, the output of which includes the two error-signal modulated subcarrier signals produced at the ground station. Accordingly, the output of telemetry receiver 90 is applied to subcarrier demodulators 92 and 94 and there demodulated by combination with the output of a subcarrier oscillator 96 to yield direct-current signals for application to motors 86 and 88, respectively.

The remote orientation control system thus far described provides control of orientation with an accuracy which depends upon the number of half wavelengths by which antennas 10, 12, and 14 are separated when the satellite departs from the desired orientation. This, in turn, depends upon the physical separation of antennas 10, 12, and 14 in plane 16. However, when this separation becomes greater than one-half wavelength of the carrier frequency employed to generate the satellite signals, ambiguity, as to whether one antenna is one or a larger odd number of wavelengths further away from the control station than another, occurs. On the other hand, if the antennas are located more closely together than one-half wavelength, accuracy of measurement is impaired because of the small difference in path length which must be determined.

These difficulties are overcome by the modification of the remote control system shown in FIGS. 3 and 4 of the drawings. Here, additional antennas are provided on the satellite and additional control channels are furnished at the remote control station to eliminate the ambiguity. Thus and as shown in FIG. 3 of the drawings, the satellite is provided with an array of antennas 100, 102, and 104, located at the vertices of a triangle 106, the plane of which is to be maintained normal to the line-of-sight 108 to the control station. Antennas 100, 102, and 104 are spaced by distances which are large as compared to one-half wavelength of the carrier frequency employed to generate the suppressed-carrier, double-sideband signals to be radiated therefrom, as in the arrangement of FIG. 2 of the drawings. The output of radio frequency oscillator 110 serves as a common carrier source and is employed in balanced modulators 112, 114, and 116 to generate in response to the outputs of low frequency oscillators 118, 120, and 122, respectively, suppressed-carrier, double-sideband signals for application to antennas 100, 102, and 104 in the same manner as in the arrangement shown in FIG. 1 of the drawings.

Here, however, additional low frequency oscillators 124 and 126, tuned respectively to frequencies $f_4$ and $f_5$, produce modulating signals which are applied to balanced modulators 128 and 130, respectively, to yield double-sideband, suppressed-carrier signals which are applied respectively to additional antennas 132 and 134. These antennas are located at the two lower vertices of a triangle 136, which is similar to and much smaller than triangle 106, to form a secondary antenna array with antenna 102. Thus it will be understood that five amplitude-modulated, double - sideband, suppressed-carrier signals are radiated from the satellite; three from an antenna array comprising antennas 100, 102, and 104, the individual antennas of which are separated by distances large with respect to one-half wavelength of the generating carrier frequency, and two from antennas 132 and 134, which are separated from each other and from antenna 102 by distances less than one-half wavelength of the generating carrier frequency. At the ground station, these five signals may be employed for accurate and unambiguous determination of the misalignment of plane 106 from normality to the line-of-sight to the control station.

At the ground station, as shown in FIG. 4 of the drawings, the five signals mentioned above are received by an antenna 138 and applied through a radio frequency amplifier 140 to mixers 142 and 144 to which are also applied output signals from a voltage-tuned oscillator 146, one of these signals being applied directly to mixer 142 and the other by way of a 90-degree phase shifter 148 to mixer 144. In the manner already described in connection with FIG. 2 of the drawings, components from the outputs of mixers 142 and 144 are abstracted by filters 150 and 152, respectively, tuned to frequency $f_1$ and act through balanced modulator 154 to control oscillator 146 as a source of reconstituted carrier signal corresponding to the carrier from oscillator 110 on the satellite.

In a manner entirely analogous to that described in FIG. 1 of the drawings, balanced modulators 156, 158, 160, and 162 yield output error signals representative of departures from the required phase and frequency of the respective carriers which would have been reconstituted from the several sideband pairs and that represented by the output of local oscillator 146.

The error signal derived at the output of balanced modulator 156, and representing the difference in distance from the ground station to antennas 100 and 102, varies sinusoidally as this difference in distance increases from zero through one-half wavelength and beyond. Such variation is represented by curve $a$ of FIG. 5 of the drawings. It will be recognized that, depending upon the actual extent of misalignment of the satellite, an ambiguity as to the error and as to the correction to be made to eliminate the error, will exist. In a similar fashion, the error signal derived from balanced modulator 158, and representing the difference in the distances of antennas 100 and 104 on the satellite from the control station, will also take the form of a sinusoid similar to that shown in curve $a$ of FIG. 5. On the other hand, because of the close spacing of antennas 100, 132, and 134, the error signal outputs of balanced modulators 160 and 162 are more accurately represented by curve $b$ of FIG. 5 wherein the error increases essentially linearly as misorientation increases. These two error signal outputs may be combined to yield a control signal which is accurate and unambiguous through the use of the technique now to be described.

For this purpose, the outputs of balanced modulators 156 and 158 are applied to adding or combining circuits 164 and 166, respectively. In addition, the output of balanced modulator 160 is applied to combining circuit 164 by way of a limiter 168 and the output of balanced modulator 162 is applied to combining circuit 166 by way of a limiter 170. Limiters 168 and 170 are arranged to limit both positively and negatively at levels illustrated by curves $c$ of FIG. 5. Thus, the combined output of adder 164 or of adder 166 will take the form of curve $d$ of FIG. 5 and will not have a polarity ambiguity. The outputs of combining circuits 164 and 166 are transmitted as control signals to the satellite by the same telemetry arrangement, including a subcarrier oscillator 172, separate subcarrier modulators 174 and 176, respectively, a carrier modulator 178, and a carrier oscillator 180, as employed in the arrangement shown in FIG. 2. Remote control of the satellite shown in FIG. 3 is then afforded by any suitable attitude control equipment 182 in response to the output of a telemetry receiver 184 associated with receiving antenna 186. Conveniently, this equipment may be the same as that shown in FIG. 2 of the drawings.

What is claimed is:

1. In apparatus for determination of the relative distance to spaced transmitting points radiating different double-sideband, suppressed-carrier signals generated from the same carrier, means for receiving and demodulating one of said double-sideband signals, means responsive to the demodulated signals to reconstitute the carrier employed at said transmitting points, and means employing the reconstituted carrier for producing outputs from the other double-sideband signals, the polarities and amplitudes of said outputs being a measure of relative distance to the respective ones of said transmitting points.

2. In apparatus for determination of the orientation of a reference plane on a mobile transmitter from plural suppressed-carrier, double-sideband signals radiated from different antennas spaced on said reference plane, a local generator of carrier signals, means utilizing the local carrier for receiving and demodulating one of said double-sideband signals to control said local generator to reconstitute said carrier, means employing the reconstituted carrier for demodulating the other double-sideband signals from said mobile transmitter, and means producing outputs, the polarities and amplitudes of which correspond to the relative distances to the antennas radiating said other pairs of sidebands.

3. In apparatus for the determination of the orientation of a reference axis of the space satellite from plural suppressed-carrier, double-sideband signals radiated from different points in a plane normal to said axis, a local carrier generator, means for receiving and demodulating one of said double-sideband signals for use in control of said local generator to reconstitute the carrier, and means employing the reconstituted carrier for producing outputs from the other double-sideband signals, the polarities and amplitudes of which are a measurement of relative distance to the corresponding ones of said spaced points.

4. In a system for controlling the attitude of an earth satellite, a plurality of radiators disposed on the satellite in a plane transverse to an axis of the satellite to be controlled, means for generating from a single carrier separate double-sideband, suppressed-carrier signals for radiation by respective ones of said radiators, means at a ground station for receiving and demodulating one of said double-sideband signals to control reconstitution of the carrier, and means employing the reconstituted carrier to produce outputs from the other double-sideband signals from the satellite proportional to the relative distances to said radiators.

5. In a system for controlling the attitude of an earth satellite, a plurality of radiators disposed on the satellite in a plane transverse to an axis of the satellite to be controlled, means for generating from a single carrier separate double-sideband, suppressed-carrier signals for radiation by respective ones of said radiators, means at a ground station for receiving and demodulating one of said double-sideband signals to control reconstitution of the carrier, means employing the reconstituted carrier for producing demodulated outputs from the other double-sideband signals from the satellite, and means for generating control signals for radiation to said satellite proportional to the polarities and amplitudes of the demodulated outputs corresponding to said other pairs of sidebands.

6. In a system for determining the relative distances of a plurality of spaced antennas, means for generating from a single carrier separate double-sideband, suppressed-carrier signals for radiation by respective ones of said antennas, a remote station, means thereat for receiving and demodulating one of said double-sideband signals to control reconstitution of the carrier, means employing the reconstituted carrier for producing demodulated signals from the other double-sideband signals, and means utilizing the demodulated signals to produce quantities indicative of the differences in distance to said antennas.

7. In a system for controlling the attitude of an earth satellite, at least three radiators disposed on the satellite in a plane transverse to an axis of the satellite to be controlled, means for generating from a single carrier separate double-sideband signals for radiation by the respective ones of said radiators, means at a ground station for receiving and demodulating one of said double-sideband signals to control reconstitution of the carrier, means utilizating the reconstituted carried for producing demodulated outputs from the other two double-sideband signals from the satellite, and means for generating a control signal proportional to the polarity and amplitude of the demodulated output corresponding thereto.

8. In a system for controlling the attitude of an earth satellite, a source of carrier waves, a plurality of radiators disposed on the satellite in a plane transverse to the axis of the satellite to be controlled and at separations large with respect to one-half wavelength of the carrier frequency, means for generating from said carrier separate double-sideband, suppressed-carrier signals for radiation by the respective ones of said radiators, means at a ground station for receiving and demodulating one of said double-sideband signals to control reconstitution of said carrier, means utilizing the reconstituted carrier for producing demodulated outputs from the other double-sideband signals from the satellite, and means for generating control signals for radiation to said satellite proportional to the polarities and amplitudes of the respective demodulated outputs.

9. In a system for controlling the attitude of an earth satellite, a source of carrier waves, a plurality of radiators disposed on the satellite in a plane transverse to the axis of the satellite to be controlled and at separations large with respect to one-half wavelength of the carrier frequency, means for generating from the carrier separate double-sideband, suppressed-carrier signals for radiation by the respective ones of said radiators, means at a ground station for receiving and demodulating one of said double-sideband signals to control regeneration of said carrier, means utilizing the regenerated carrier for producing outputs from the other double-sideband signals, the polarities and amplitudes of which are a measure of the relative distances to said radiators, and means for eliminating ambiguites in the distances determined by said last-mentioned means.

10. In a space satellite, means for generating signals permitting remote interferometric determination of the orientation of a reference plane of said satellite comprising a plurality of radiators disposed on the satellite in said reference plane, means for generating from a single carrier separate double-sideband, suppressed-carrier signals, and means for applying said suppressed-carrier signals for radiation to the respective ones of said radiators.

11. In a space satellite, means for generating signals suitable for remote interferometric determination of the orientation of a reference plane of said satellite comprising three radiators disposed in triangular configuration in said plane, means for generating from a single carrier separate double-sideband, suppressed-carrier signals, and means for applying said suppressed-carrier signals individually to respective ones of said radiators.

12. In a space satellite, means for generating signals suitable for remote interferrometric determination of the orientation of a reference plane of said satellite comprising a first array of radiators disposed in said reference plane at distances of one-half wavelength or less of a carrier frequency to be radiated therefrom, a second array of antennas disposed in said plane at distances greater than one-half wavelength of said frequency, means for generating from a single carrier source of said frequency separate double-sideband, suppressed-carrier signals, and means for applying individual ones of said suppressed-carrier signals to each respective antenna of each array of antennas.

13. In a space satellite, means for generating signals suitable for remote interferometric determination of the orientation of a reference plane of said satellite comprising a first array of radiators disposed in triangular configuration in said reference plane as separations of less than one-half wavelength of signals to be radiated therefrom, a second array of antennas including at least one antenna of said first array and disposed in triangular configuration in said reference plane with separations greater than one-half wavelength of said frequency, a source of carrier waves of said frequency, means for generating therefrom separate double-sideband, suppressed-carrier signals, and means for applying individual ones of said suppressed-carrier signals to the respective individual radiators of each of said arrays.

No references cited.